Feb. 7, 1956    J. J. STRNAD    2,733,560
COUNTERBALANCING MEANS FOR WORK ROTATING MACHINE TOOLS
Original Filed March 16, 1951    8 Sheets-Sheet 1
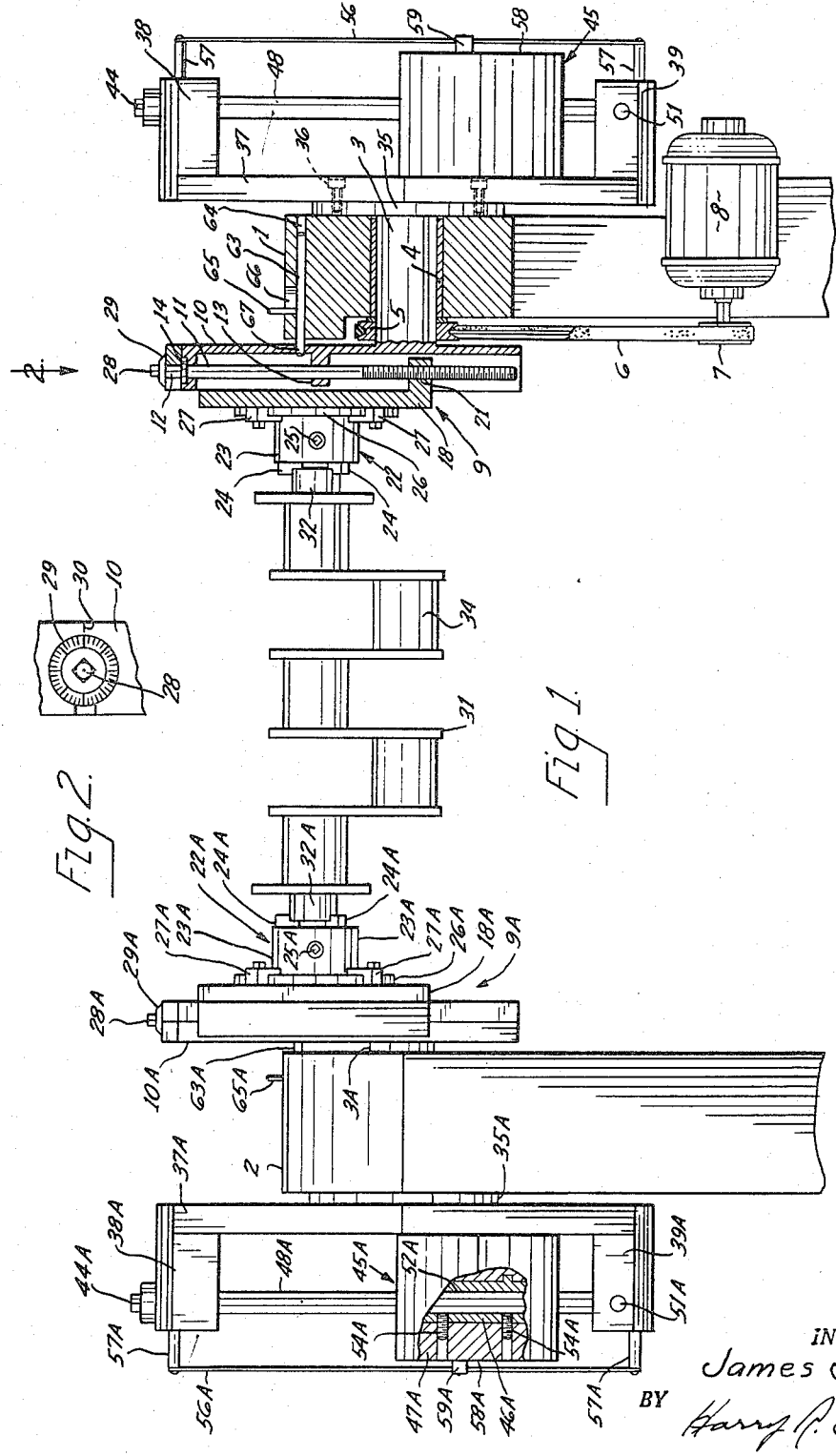
INVENTOR.
James J. Strnad
BY
Harry P. Canfield
ATTORNEY.

Feb. 7, 1956 J. J. STRNAD 2,733,560
COUNTERBALANCING MEANS FOR WORK ROTATING MACHINE TOOLS
Original Filed March 16, 1951 8 Sheets-Sheet 2
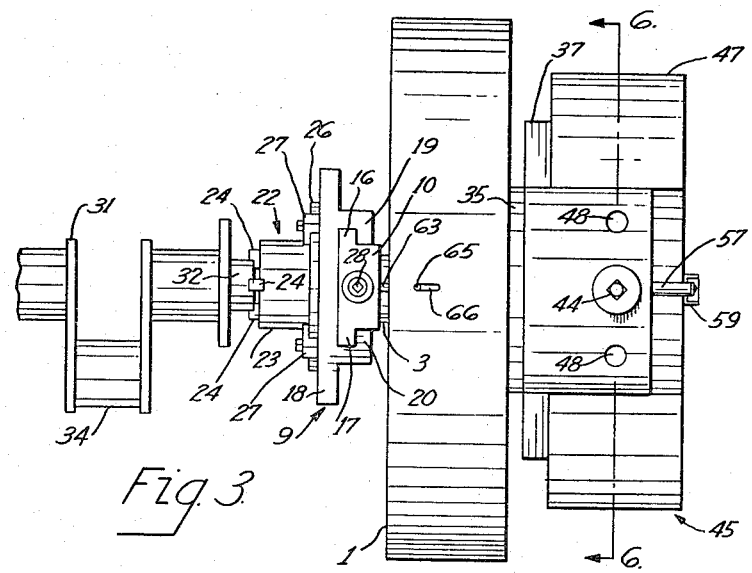
Fig. 3.
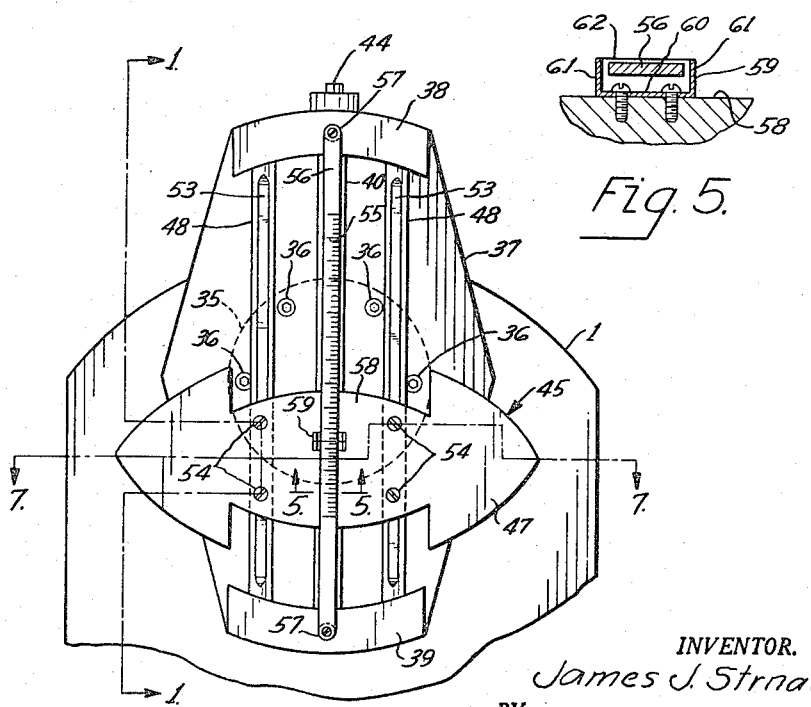
Fig. 5.
Fig. 4.
INVENTOR.
James J. Strnad
BY
Harry P. Canfield
ATTORNEY.

Feb. 7, 1956 J. J. STRNAD 2,733,560
COUNTERBALANCING MEANS FOR WORK ROTATING MACHINE TOOLS
Original Filed March 16, 1951 8 Sheets-Sheet 3

INVENTOR.
James J. Strnad
BY
ATTORNEY.

Feb. 7, 1956  J. J. STRNAD  2,733,560
COUNTERBALANCING MEANS FOR WORK ROTATING MACHINE TOOLS
Original Filed March 16, 1951  8 Sheets-Sheet 6

INVENTOR.
BY James J. Strnad
Harry J. Canfield
Attorney

Feb. 7, 1956  J. J. STRNAD  2,733,560
COUNTERBALANCING MEANS FOR WORK ROTATING MACHINE TOOLS
Original Filed March 16, 1951  8 Sheets-Sheet 7

INVENTOR.
James J. Strnad
BY Harry P. Canfield
Attorney

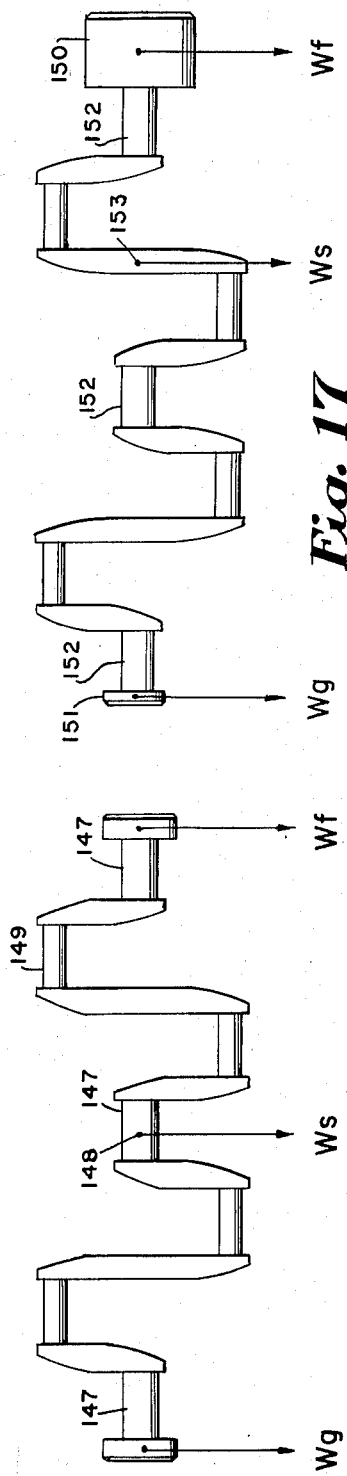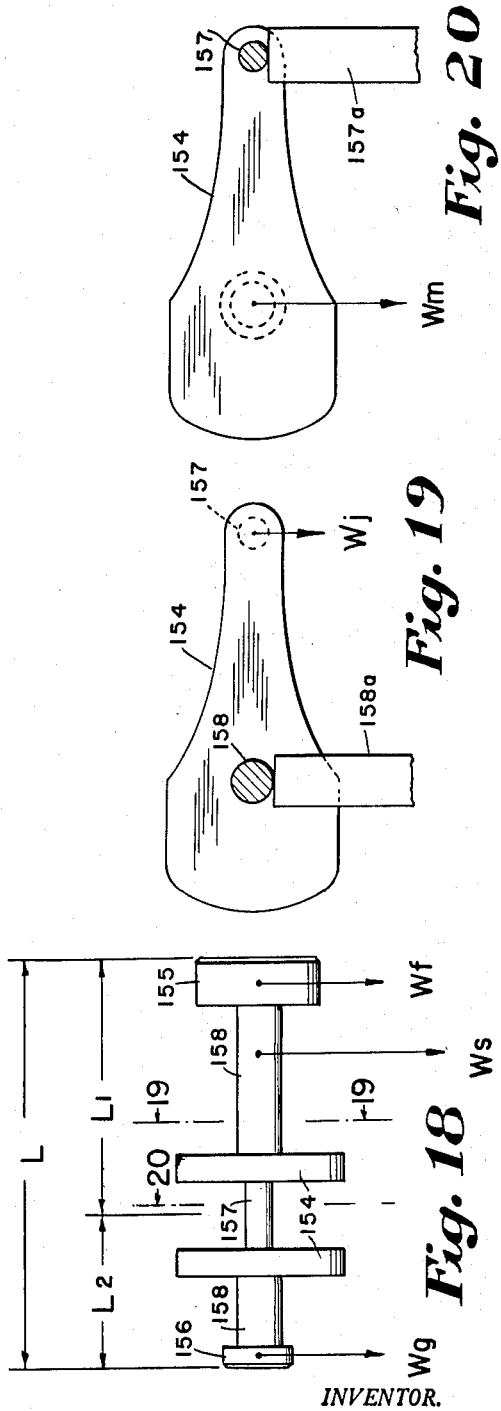

United States Patent Office 2,733,560
Patented Feb. 7, 1956

2,733,560

COUNTERBALANCING MEANS FOR WORK ROTATING MACHINE TOOLS

James J. Strnad, Shaker Heights, Ohio, assignor to Lempco Products, Inc., Bedford, Ohio, a corporation of Ohio Continuation of application Serial No. 216,037, March 16, 1951. This application September 19, 1952, Serial No. 310,415

5 Claims. (Cl. 51—237)

This invention relates to machine tools of the class in which the work is rotated.

This application is a continuation of application Serial Number 216,037, filed March 16, 1951, now abandoned.

The invention relates more particularly to such machines that are sometimes used to rotate work on an axis that is not through the center of gravity of the work; typical of which are machines which are used to grind the crank journals of engine crank shafts, in which case, the crank shaft as a whole is rotated bodily on an axis of one of the crank journals that is, on an axis offset laterally from the main bearing axis of the crank shaft.

The invention is applicable to other work than crank shafts, but since that is one of its principal applications, it has been chosen for illustration and description herein primarily as a crank shaft grinder, as illustrative of all of its applications. The actual invention is that set forth in the claims hereof.

The invention comprises, generally, a machine having work holders or chucks mounted on machine shafts or spindles for gripping opposite ends of the work, and the spindles are rotated by power whereby work operations, such for example, as grinding, may be performed around a main axis of the work coincident with the spindle axis; and the chucks are parts of so-called adjustable throw heads by which the opposite portions of the work, gripped respectively by the chucks, can be shifted radially of the spindle axis of the machine to cause the work to revolve with a planetary motion around another axis of the work laterally displaced from the main axis whereby work operations can be performed around said other axis of the work.

When the throwheads are offset radially as referred to, and the work is rotating with said planetary motion, the work, particularly so in the case of crank shafts, is out of static balance with respect to the spindle axis, and this is usually true of the throwheads themselves, and therefore, at the rotary speeds commonly employed, destructive vibrations will be set up in the machine, in the absence of anything to compensate therefor; and the invention further comprises counterbalancing weight means to compensate for the static unbalance of the rotating work and throwheads and prevent such vibration.

The position of the counterbalancing weight means is adjustable radially by an improved adjusting means and in an improved manner, such means comprising suitably calibrated scale means, whereby the counterbalancing weight means can be accurately preset to a preselected scale reading for any radial displacement of the chucks and for any given work, for example a given crank shaft, whereby positioning the counterbalancing weight means by trial and error to effect balance as heretofore necessary, is obviated.

Preferably the counterbalancing weight means comprises two counterweights one at each end of the machine each with an adjustment scale. Each throwhead is mounted on a shaft or spindle, one being the main spindle driven by power, and the other chuck and spindle being driven through the work. The spindles have a common axis; and each throwhead is on the inner end of its spindle, and a counter weight on the outer end.

By this construction the loads on the spindle bearings are, in each case, distributed thereover, with correspondingly reduced wear; and the adjustment for the counter weights is at the extreme outer ends of the machine and readily accessible; and centrifugal forces that develop in the crank shaft while being rotated and exerting forces on the head stock and tail stock tending to rock them on the main base of the machine, are counteracted, and the tendency to rock is eliminated, by like centrifugal forces developed in the counterweights.

The object of the invention is to provide a machine tool having the advantages and mode of operation set forth above.

The invention is fully disclosed in the following description taken in connection with the accompanying drawing in which:

Fig. 1 is a front elevational view of a machine embodying the invention in a first form with parts broken away and in section;

Fig. 2 is a fragmentary view taken in the direction of the arrow 2 of Fig. 1;

Fig. 3 is a top plan view of a part of Fig. 1;

Fig. 4 is an end elevational view from the right hand end of Fig. 1;

Fig. 5 is a fragmentary sectional view from the plane 5 of Fig. 4, to enlarged scale;

Figs. 16, 17 and 18 are diagrammatic views of different types of crank shafts, illustrating weight factors thereof;

Figure 21:
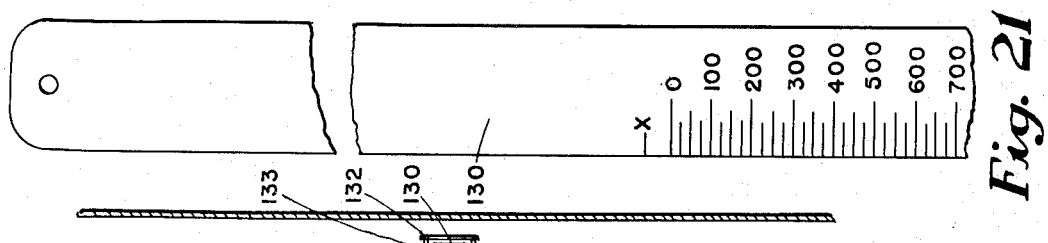

Figs. 19 and 20 are views from the planes 19—19 and 20—20 of Fig. 18 illustrating the method of finding weight factors thereof;

Fig. 21 is a view of a fragment of a scale shown in other figures but to larger scale.

The first mentioned embodiment of the invention, Figs. 1 to 9, is shown in simplified form and is particularly useful in special cases in which, as will be fully described hereinafter, the machine has throw heads on each of two axially aligned machine spindles, and each throw head comprises a chuck and turtle or chuck base and a radial guideway therefor. The two chucks and turtles are considered as being of equal weights, and each as being in balance around its chuck axis. The radial guideways for simplification are permanently attached to the corresponding spindles. The work to be ground is a symmetrical crank shaft, that is, is one having its center of gravity in its main journal axis and midway between its ends.

The second embodiment of the invention of Figs. 10 to 21 is for more universal use; and the chuck and turtle of each throw head are considered as being of unequal weights; and each as being out of balance around the chuck axis; and the guideway on the spindle is removable, to enable work supporting "centers" to be used optionally, to support other kinds of work than crank shafts; and when crank shafts are to be ground they may be symmetrical as aforesaid or may be of any one of several asymmetrical types.

Referring to the drawing, Figs. 1 and 2, there is shown at 1 and 2, respectively, the head stock and tail stock of a machine tool embodying the invention.

They are mounted on a common base, and the tail stock 2 may be moved on the base toward and from the head stock 1 to position it for different lengths of work, but such construction features being well known have not been shown.

In the head stock 1, is a main shaft or spindle 3, rotatable in a suitable bearing 4, and driven by a V-belt pulley 5 thereon, connected by a V-belt 6, to a corresponding pulley 7, on a driving motor 8. These parts are shown simplified and somewhat diagrammatically to minimize the drawing and description.

The ends of the spindle 3, project oppositely out of the head stock and on the inner end is mounted a throwhead indicated generally at 9.

The throwhead 9 comprises a radial guideway 10, connected directly to the spindle 3, and rotatable therewith.

A screw 11, is rotatably mounted on the guideway 10, in bearings 12—13, and anchored against longitudinal movement by a collar 14 on the screw, at the bearing 12; and a wrench receiving head 28, on the screw is provided to rotate it.

The guideway 10 has ways 16—17, see Fig. 3, extending transversely, that is radially, of the axis of the head spindle 3, at right angles thereto, and a chuck turtle 18 has slide ways 19—20, embracing the guide ways 16—17. The turtle 18 has a threaded bore 21, with which the screw 11 meshes, whereby, upon turning of the screw, the turtle 18 is propelled radially rectilinearly along the guide ways 16—17 at right angles to the spindle axis.

A work gripping chuck indicated generally at 22, of well known form comprises a housing 23, in which a plurality of chuck jaws, 24—24, having a common axis are mounted to move radially simultaneously upon rotation of an operating element by a wrench, the wrench receiving portion thereof being shown at 25. The housing 23 is mounted on the turtle 18 by means of a flange 26 on the housing and flange overhanging clamp devices 27—27 on the turtle 18.

The axis of the chuck 22 will thus be moved to different positions parallel to and radially displaced from the axis of the spindle 3, upon rotation of the screw 11; and its distance therefrom may be indicated on a suitably calibrated indicating scale or dial 29, on the outer end of the screw 11, an inscribed reference line 30 therefor being provided on the guideway 10.

The construction at the tail stock end of the machine is preferably the same as that above described for the head stock end, except that the spindle and throw head are not power driven. Parts corresponding to those at the head stock end are identified by the same reference characters used above, but with the suffix A. The spindles 3 and 3A have a common axis.

As illustrative of a work piece, a crank shaft has been shown at 31, having shaft extensions 32—32A coaxial with the main journals of the shaft gripped in the chucks 22 and 22A by the jaws 24—24A. The chucks 22 and 22A have been adjusted by their screws 11—11A, to bring the axis of the crank journal 34, coincident with the spindle axis of the machine. This is done by knowledge of the crank throw of the crank shaft that is, the radial distance of the axis of the crank journal 34, from the axis of the shaft extensions 32—32A, and by rotation of the screws 11—11A from a zero dial position to a dial position indicating that distance, including a number of complete revolutions of the dial as will be understood.

Upon rotation of the head stock spindle 3, and chuck 22, the chuck 22A, and tail stock spindle are driven by the crank shaft.

The whole crank shaft then rotates with a planetary movement around the axis of the crank journal 34, and the latter may be worked by the periphery of a grinding wheel or other tool not shown, but commonly employed for such purpose.

The counterbalancing and compensating feature referred to, for preventing vibration of the machine and work due to the planetary, statically unbalanced rotation of the crank shaft and throw heads will now be described.

The outer end of the main spindle 3 has a flange 35 thereon, upon which is mounted, by screws 36—36, a frame 37, having axially directed heads 38—39 at opposite sides of the spindle axis.

A screw 40, having unthreaded bearing portions at its ends, is rotatably mounted in bearings 41—42 in the heads 38—39 and has a collar 43, trapped in an annular recess in the bearing 41 to prevent endwise movement of the screw. Outwardly of the bearing 41, the screw 40 has a wrench receiving head 44 for turning it.

The mass of the frame 37, and heads 38—39, and screw 40 is preferably symmetrically disposed at each side of the axis of the main spindle 3; and the screw is disposed so that as it rotates with the frame 37 and spindle 3, the screw axis and spindle axis are always in a common plane.

A counterweight is shown generally at 45 and comprises a central body or core 46 of metal such as cast iron, enclosed within a mass of lead 47, by molding the lead around it; the core having a contour that interlocks with the lead to make the two parts in effect one integral weight, and to prevent the lead from coming loose on the core.

The screw 40 is threaded through the hard weight core 46, independently of the soft lead weight 47, and upon rotation of the screw, on its axis, the weight 46—47 is propelled along the screw.

The mass of the weight and core, 46—47, is disposed around the screw so that as the screw propels it, its center of gravity moves in a plane through the spindle axis.

A pair of rectilinear guide rails 48—48, preferably made from round bar stock extend parallel to the screw 40, equally spaced from opposite sides thereof, and at their opposite ends project into bores 49—49 in the frame head 38, and into bores 50—50 in the frame head 39, and are secured in the bores and prevented from rotating therein by pins 51—51, projected through aligned holes in the rails and in the frame head 39.

The guide rails 48—48 extend slidingly through guide bores 52—52 in the weight core 46. The rails thus guide the said screw-propelled movement of the counterweight and hold it rigidly on the frame 37 and prevent its rotation around the screw 40.

The guide rails 48—48 on the portions between the heads 38—39, have flat faces 53—53 thereon; and four lock screws 54—54 are threaded through the side of the weight core 46 and abut at their inner ends upon the flat faces 53—53 by which the weight, after being adjustably positioned by the screw 40, may be locked against shifting from that position; and whereby, the weight 46—47 is made rigid on the frame 37.

The positions of the weight 46—47 are indicated on a scale 55 Figs. 1, 4 and 5 provided on a strip of sheet metal 56, mounted at its ends on posts 57—57, extending from the frame heads 38—39, and parallel to the screw 40 and lying close to an axially outward face 58 on the weight.

A channel shaped bracket 59 is mounted by its channel web 60 upon the said face 58 of the weight with its channel flanges 61—61, straddling the scale strip 56.

A horizontal wire 62 is mounted on the ends of the channel flanges and lies close to the front scale side of the strip 56, and constitutes a "pointer" for reading the scale.

At the tail stock end of the machine Fig. 1, is a counter-balancing mechanism like that described above for the head stock end and corresponding like parts are designated by the same reference characters with the suffix A. The counterweights 45 and 45A are made of equal weight.

In the setting up of a crank shaft in the chucks as referred to, the spindle 3A is rotated to bring the guide way 10A of the throwhead 9A parallel to that of the throwhead 9, and they are locked in that relation until the work is gripped in both chucks. This is done by locks on both head stocks as follows.

As shown in Fig. 1, at the head stock 1, a lock bolt 63 is reciprocable in a horizontal guide bore 64, by a handle 65 projecting outwardly through a slot 66, the ends of the slot serving as stops for the handle to limit the lock bolt movement. An accurately located hole 67 is provided in the guideway 10, into which the end of the lock bolt may be projected to lock the guideway as aforesaid, or withdrawn therefrom to unlock it. It is shown in the locking position in Fig. 1.

A similar arrangement is provided at the tail stock 2.

The calibration of the counterweight scales; and the method of predetermining the scale readings for presetting the counterweights to balance the crank shaft as referred to, will now be described.

The throwhead screw dials 29 and 29A are calibrated to indicate zero, when the axes of the chucks 22 and 22A are in coincidence with the common machine spindle axis.

By means of the counterweight screws, for example the screw 40, the center of gravity of the counterweight 46—47 can be moved toward or from the machine spindle axis, but the supporting frame 37 thereof and associated parts 38—39—48 etc. cannot, and their center of gravity may be somewhat offset from the spindle axis at all times; and the same is true of the other counterweight frame 37A; and the weights of the two frames and parts may not be equal.

The adjustably movable parts of the throwhead 9 including the chuck 22 and turtle 18 and the slides 19—20 can be made of the same weight as the corresponding parts of the throwhead 9A, and they can be made to have their centers of gravity on the axes of their work gripping jaws 24; and this will be assumed to have been done; but the supporting parts of throwhead 9 secured to the spindle 3 including the guideway 10 and ways 19—20 and screw 11 etc., and like parts of throwhead 9A, will usually have their centers of gravity at one side of the chuck axis, and the weights of these parts of the two throwheads may not be equal.

During the mounting of the counterbalance frame 37 on the spindle 3 by the bolts 36—36, it is positioned so that the rails 48—48 are vertical when the ways 16—17 of the guideway 10, which is also mounted on the spindle 3, are vertical; and this relation is effected at both ends of the machine.

The guideway 10 and associated parts, and the counterbalance frame 27 and associated parts, are made so that when thus relatively mounted, a plane through the spindle axis passes through the center of gravity of the guideway 10 and the frame 27.

To set up the machine and to calibrate the scale, a zero mark is first found for the scales as follows. The head stock chuck 22 is adjusted at the dial 29 until its work gripping axis is coaxial with the head stock spindle 3. The spindle is then driven at maximum speed, and from time to time, the counterweight 46—47 is moved by the screw 40, by trial and error, until vibration disappears, and this counterbalances the guideway 10 and counterweight frame 27 on the head stock end. A zero mark is then put on the scale 56 at the pointer wire 62 and the rest of the scale calibrated therebeyond as described later.

The tail stock chuck is similarly positioned coaxial with the spindle 3A at that end; and a piece of round symmetrical bar stock is gripped in both chucks to thereby drive the tail stock chuck and counterbalance weight and it is driven at maximum speed and its counter balance weight adjusted to eliminate vibration and its scale given a zero mark.

The scale is calibrated beyond the zero mark for presetting to counterbalance the crank shaft as follows.

The throw of the crank shaft to be worked is known or can be measured in inches; and with the two throw heads put in parallel relation by their lock devices as described above, they are adjusted by their dials 29 and 29A, until their work gripping axes are displaced radially from their spindle axes by the amount of the throw.

The crank shaft is then gripped in the chucks and the lock devices are then released.

The weight of the crank shaft in pounds is known or is found by weighing it.

The weights of the adjustably movable parts of the throwheads are made equal as mentioned, and their weights are known.

The weights of the counterweights likewise are made equal and their weights are known.

It has been found that if the counterweights are positioned to fully counterbalance the crank shaft and movable parts of the two throwheads, the relation may be expressed by a fundamental equation as follows:

$$S \times 2W_3 = (W_1 + 2W_2)T$$

Or, $$S = \frac{(W_1 + 2W_2)T}{2W_3}$$

Where $W_1$ is the weight of the crank shaft in pounds;
$W_2$ is the weight of one of the chucks and its turtle in pounds;
$W_3$ is the weight of one counterweight in pounds;
$T$ is the crankshaft throw in inches;
$S$ is the distance on each of the scales beyond the aforesaid zero marks at which each of the counterweights is positioned.

As aforesaid, $W_2$ and $W_3$ are known, for any given machine; and $W_1$ and $T$ can be ascertained for a given crank shaft.

Substituting these values in the above equation and solving for $S$, gives $S$ in inches.

The scales are calibrated in inches beyond the said zero mark and the counterweights each preset to the value of $S$ on the scale to effect counterbalance.

To make the presetting of the counterweights simpler for the operator, and involve less computation and liability of error, the equation may be considered as:

$$S \times 2W_3 = (W_1 + 2W_2)T$$

and the scale is calibrated in inch-pounds, with the inch divisions of the scale representing values of $S \times 2W_3$; so that all that the operator has to do is find the value of $(W_1 + 2W_2)T$, that is, add the weight of the countershaft to the weight of the two chucks and turtles and multiply by the crank throw, and read that value on the scale, and preset the counterweights to that reading.

As a concrete example of the scale in this instance, the following values can be assumed for a given machine.

$$W_1 = 2500\#$$
$$2W_2 = 100\#$$
$$T = 7''$$
$$2W_3 = 1800\#$$

To find $(W_1 + 2W_2)T$, the operator would simply take the weight of the crank shaft and add 100 and multiply by the throw.

This would give 18,200 inch-pounds.

The divisions on the scale one inch apart would represent $S \times 2W_3$ or $S \times 1800$ inch pounds. The scale reading would therefore be $18,200 \div 1800 = 10.11''$ to which the operator would set the counterweights.

Figure 7:
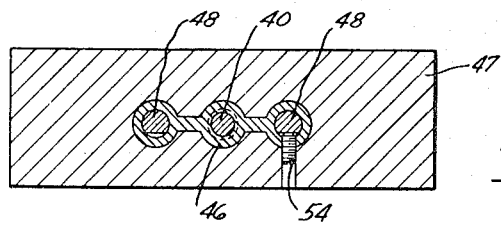
Fig. 7 is a sectional view from the plane 7—7 of Fig. 4, with parts behind the section plane omitted.
Figures 8, 9:
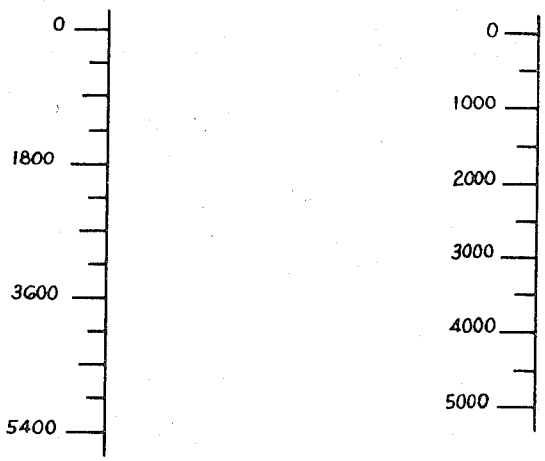
Figs. 8 and 9 are views illustrating scales that may be used for presetting counterbalancing weights of the machine of the other figures.
Figure 6:
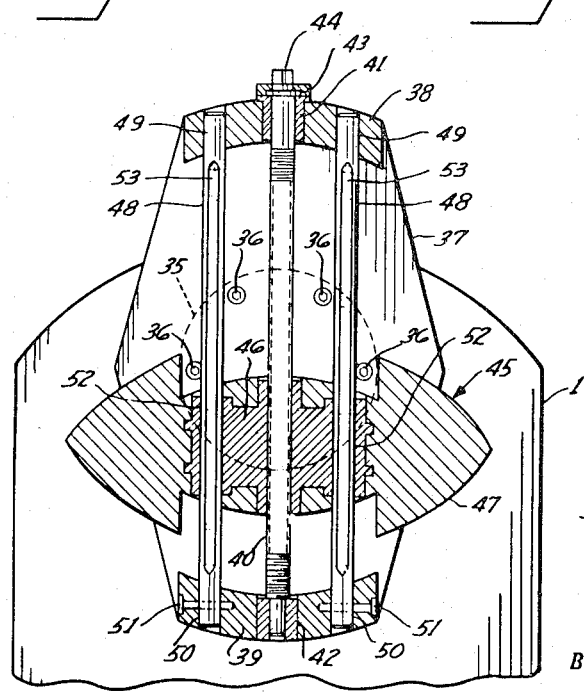
Fig. 6 is a view similar to Fig. 4 but with parts in section.
Figure 10:
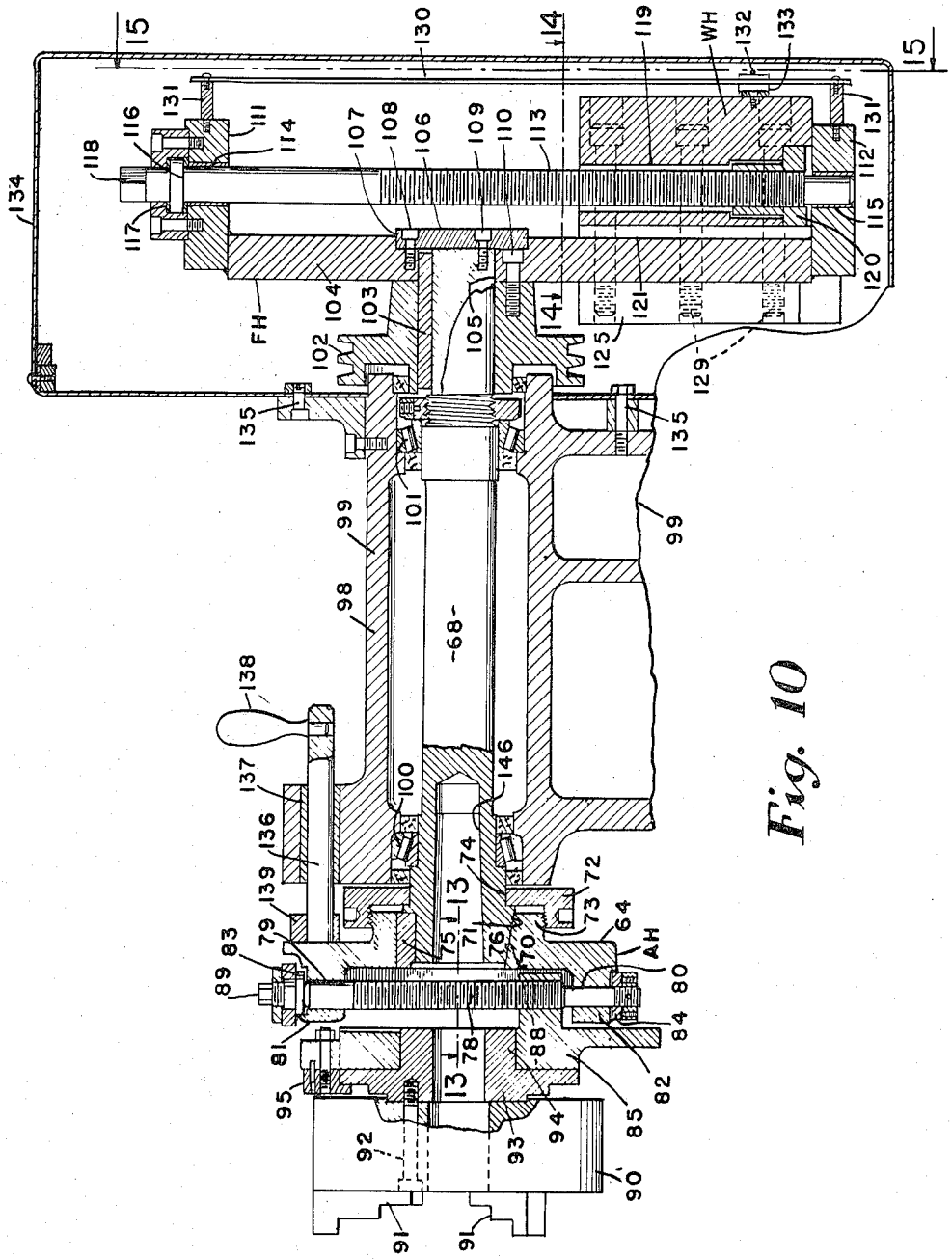
Fig. 10 is a longitudinal view of the head stock end of a machine embodying my invention in another form with parts broken away and parts in section.
Figure 11:
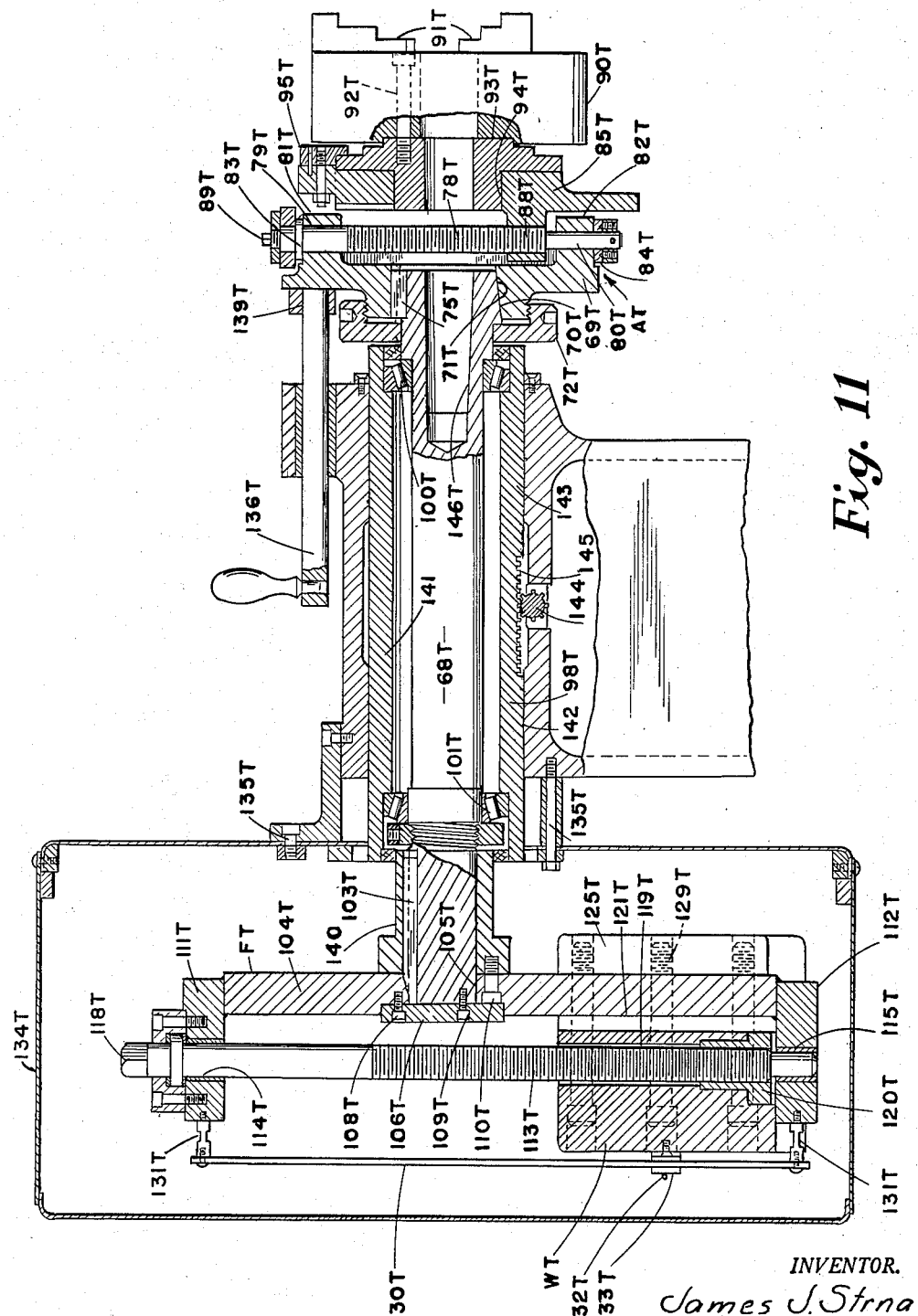
Fig. 11 is a view similar to Fig. 10 of the tail stock end of the machine.

With the value of $2W_3$ assumed to be 1800 as above, for a given machine, such a scale would appear as in Fig. 8.

It is in some cases preferable, for easy reading, to have the main divisions on the scale indicate even numbers of inch-pounds, for example 1000, 2000 etc.

To this end, the quantity 1000 can be divided by the weight of the two counterweights in pounds, and the result will be a certain fraction or multiple of an inch, and this can be used as the calibrating unit. The scales are then marked off from zero in such units as the main divisions, and numbered 1000, 2000 etc.

With the above assumed value for the counterweights, $2W_3$ equals 1800#, the calibrating unit and main scale divisions would be $$\frac{1000}{1800}$$

or $.555''$ and such a scale would appear as in Fig. 9.

The manufacturer of the machine would give operator's instructions with it, and the operator knowing the weights, $2W_2$ and $2W_3$, the instructions to counterbalance a given crank shaft would, as in the illustrative example, simply be: add 100 to the weight of the crankshaft and multiply by the crank throw, and set the counterweights to that figure on the scales (Fig. 8 or Fig. 9).

The calibrating unit of the inch-pound scales (Fig. 8 or Fig. 9) will be seen to comprise two factors; an inch or a fraction of an inch, and the weight in pounds of the counterweight; for any given machine.

The above described means and method for setting the counterweight to counterbalance the weight of the chuck and the work, makes it possible to effect complete practical counterbalance by preselected adjustment, and prevent vibration due to imbalance. While this is always subject to some error, by the operator who makes the adjustment, and a negligible residual vibration may in some cases due to his error be still present; the effects thereof are minimized still further by having the counterbalance weight and the chuck on opposite ends of the spindle.

If the counterweight were on the same side of say the head stock as the chuck, any residual imbalance would be of the static type.

Centrifugal force on the unbalanced portion of the rotating mass in such case, would produce force in all radial directions successively. This force when in the alternate horizontal directions would tend to rock the head stock back and forth from side to side in portions thereof above the machine base, and the tendency to produce vibration thereon would be amplified.

When as here the chuck and counterweight, are spaced apart axially by being on opposite ends of the spindle, any error of residual imbalance is of the dynamic type; and the horizontal forces due to imbalance exert alternate forces on the head stock in directions tending to oscillate it on a vertical axis. But the lower part of the head stock being rigid on the machine base, cannot oscillate and the effect of the error of residual imbalance is minimized.

Other advantages of having the weight and chuck on opposite ends of the spindle have already been referred to.

As to the form of Figs. 10 to 21, now to be described, it is believed that a briefer description than otherwise will suffice in view of the preceding description of the form of Figs. 1 to 9.

At the head stock end of the machine (the right end as viewed in Fig. 10) is a head stock spindle 68 upon the free inner end of which is mounted a throw head, indicated generally at AH, and removable from the spindle as a unit, and comprising the following parts.

A guideway 69 and the end portion of the spindle 68 are provided with coaxial male and female conical surfaces 70 and 71 which are drawn into wedging engagement by a spanner nut 72 surrounding the spindle, threaded as at 73 upon the guideway 69 and reacting upon a shoulder 74 on the spindle. See also Fig. 13. The guideway 69 and spindle 68 are also keyed together by a key 75; to predetermine an angular position for the guideway 69 on the spindle.

Figure 13:
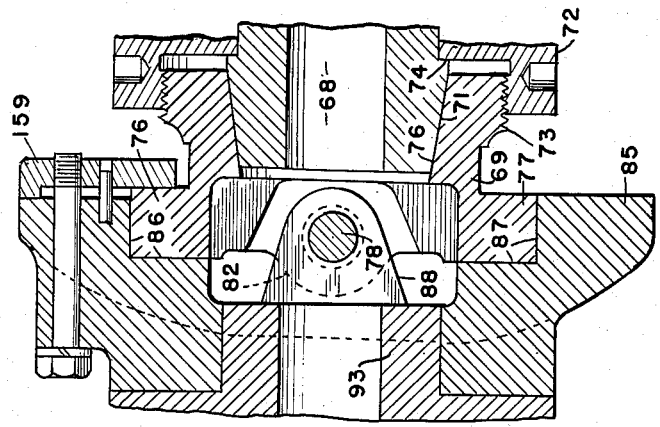
Fig. 13 is a sectional view from the plane 13—13 of Fig. 10.

The guideway 69 has spaced ways 76—77, Fig. 13.

A screw 78 is rotatable in bearings 79—80 in lugs 81—82 on the guideway 69, and the screw is anchored, by well known means at 83—84, against longitudinal shifting; and the screw is between and parallel to the ways 76—77.

A chuck "turtle" or chuck base 85 has ways 86—87, Fig. 13, slidable on and guided by the said ways 76—76; and has a nut portion 88, through which the screw 78 is threaded, whereby upon manual rotation of the screw 78, for example by a wrench receiving end 89, the turtle 85 and parts to be described attached thereto, will be propelled along the said ways; and may be locked in any position by two or more bolt-operated clamps 159—159, Fig. 13.

A chuck proper 90 has a plurality, such as three, work gripping chuck jaws 91—91, manually movable radially in unison by well known means and having a common chuck axis.

The chuck 90 is secured by bolts 92 to a head 93 rotatable in a bearing 94 on the turtle 85 to adjust the angular position of the chuck 90 with respect to the turtle 85, and two or more manually operable clamping devices 95 rigidly clamp the head 93 and chuck 90 in adjusted positions. The purpose of this adjustment is to adjustably rotatably position work gripped in the chuck about the axis of the chuck, and its use when the work is a crank shaft having a number of angularly spaced cranks is well known.

The axis of the screw 78 preferably intersects the axis of the spindle 68; and the key 75 predetermines a radial direction for the screw axis relative to the spindle axis.

The ways 76—77 and 86—87 are parallel to the screw; and the chuck 90 may be moved to different radial positions by rotating the screw; and the chuck can be moved to a position at which its axis coincides with the spindle axis.

Figure 12:
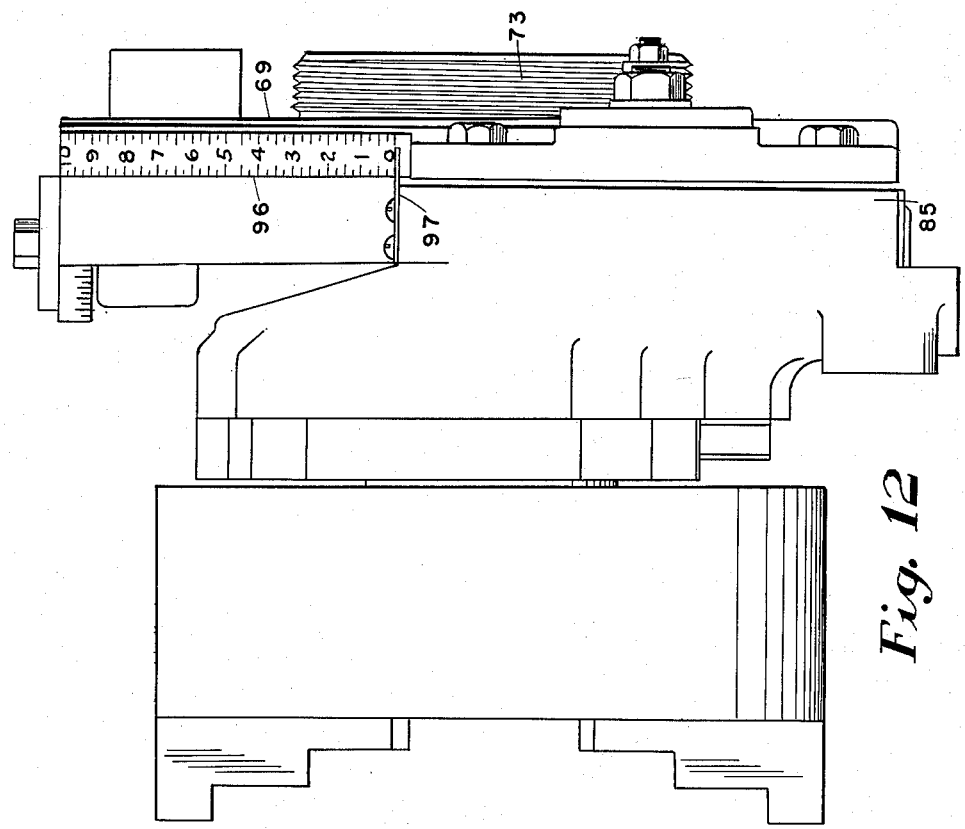
Fig. 12 is a side elevational view of a throw head of Fig. 10.
Figure 15:
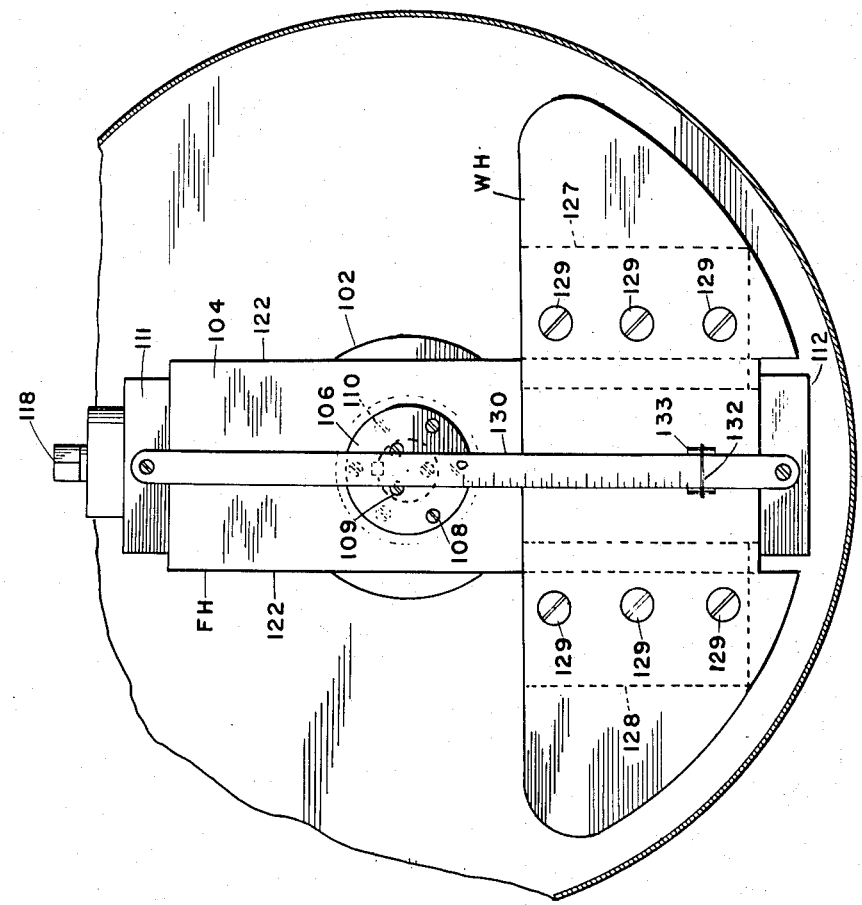
Fig. 15 is an elevational view from the plane 15—15 of Fig. 10.

As shown in Fig. 12 a scale 96 is provided on the guideway 69 and a scale pointer 97 is provided on the turtle 85 to indicate radial adjusted positions of the chuck and turtle. The scale indicates zero when the adjustment moves the chuck to a position in which its axis coincides with the axis of the spindle.

The scale 96 is preferably calibrated in inches, shown to reduced scale in Fig. 12.

The spindle 68 is housed in a tubular portion 98 of the head stock, shown fragmentarily at 99, and rotatively supported therein and held against longitudinal shifting by taper roller bearings 100—101 of well known construction.

The spindle 68 projects outwardly beyond the bearing 101 and has a V-belt pulley 102 keyed thereon as at 103, by which the spindle may be driven by a motor not shown. Upon the free end of the spindle beyond the pulley, is mounted a counterbalancing weight device comprising a counterbalance weight WH; and a weight frame indicated generally at FH and comprising the following parts.

A thick rigid back plate 104 is rigidly mounted on the free end of the spindle 68, at right angles to its axis. A bore 105 in the back plate is telescoped over the free end of the spindle, and the back plate is keyed to the spindle by the said key 103.

A circular mounting plate 106, seated in a circular recess at 107 in the back plate 104 is secured to the back plate by a series of screws 108; and the mounting plate 106 is secured upon the end of the spindle by a series of screws 109, whereby shifting of the back plate axially of the spindle is counteracted.

The back plate is rotatively positively driven with the spindle 68; and to this end besides being keyed to the spindle and pulley 102 by the key 103 is directly secured to the pulley by a series of screws 110.

At the opposite ends of the back plate 104 are axially extending end plates 111—112, welded thereto.

A screw 113 is rotatively mounted in bearings 114—115 in the end plates; and at one end the screw is anchored against endwise shifting by a collar 116 on the screw trapped in a housing 117 on the end plate; and the screw has a wrench receiving end 118 for turning it.

Figure 14:
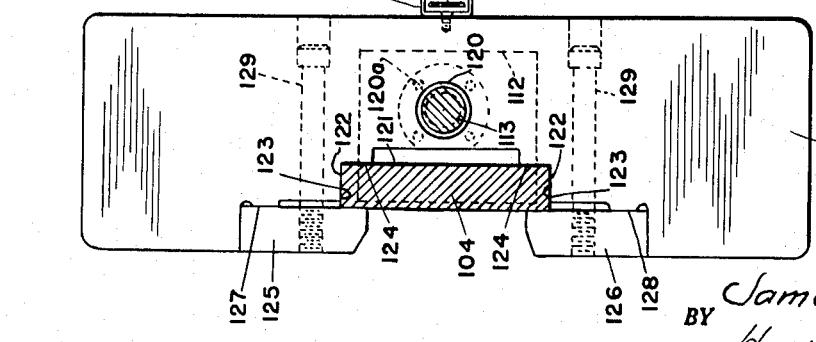
Fig. 14 is a sectional view from the plane 14—14 of Fig. 10.

The counterweight WH has a smooth bore 119 therethrough telescoped over the screw 113 and at one end the bore has a nut 120 in the bore meshed with the screw, whereby upon operatively rotating the screw, the counterweight is propelled along the screw, the nut being non-rotatively secured to the weight by screws 120a see Fig. 14.

The back plate 104 has its outer face 121 and side edge faces 122—122 machined smooth and parallel, to act as guideways; and the weight WH is machined to have faces or ways 123—123 and 124—124 fitting the said ways of the back plate, whereby propelled movement of the weight is guided, and the weight is prevented from rotating on the axis of the screw.

The counterweight is preferably made in one piece of cast iron, and is massive and heavy; and it is desirable to lock it in adjusted positions independently of the adjusting screw; and to this end it is locked to the back plate 104.

As described, the counterweight slides along the outer face of the back plate as on a guideway.

Clamp plates 125—126, bridging the inner surface of the back plate and machined surfaces 127—128 provided on the weight, are drawn tight together by lock screws 129 projected through bores in the weight and threaded into the clamp plates; three screws being provided for each clamp plate.

A scale 130 for indicating positions of the counterweight WH is made from a strip of flat steel and mounted at its ends on posts 131—131, extending from the end plates 111—112; which dispose the scale parallel to the screw 113 and close to the outer surface of the counterweight.

A scale pointer is provided by a fine wire 132 lying across the face of the scale and supported on the flanges of a small channel piece 133 mounted on the counterweight, and the wire soldered to the channels. The wire may be readjusted on the channel at anytime if necessary to accurately read zero on the scale as will be described, by one's unsoldering, moving, and resoldering it.

The entire counterweight frame FH and including the counterweight WH is enclosed in a sheet metal housing 134 attached to the head stock 99 in any suitable manner, for example by screws 135—135, to render it readily removable to give access to the adjusting screw and scale, and to provide an accident-proof enclosure for the weight and frame when rotating.

It is desirable to have the axis of the screw 113 intersect the axis of the spindle 68; and to have the mass of the counterweight frame FH, and of the counterweight WH itself, disposed symmetrically at each side of a plane containing the axis of the spindle 68 and the axis of the screw 113; and the simplicity of construction above described makes such symmetry and relations readily attainable in manufacture.

It is also desirable to have the axis of the counterweight screw 113 parallel to the axis of the throw head screw 78. As hereinbefore described, the axis of the throw head screw 78 has a position determined by the key 75 on one end of the spindle 68 and the axis of the counterweight screw 113 can readily be made parallel to it by means of the key 103 on the other end of the same spindle 68, by correspondingly cutting the key ways.

Provision is made to lock the spindle 68 against rotation, when the two said parallel screw axes of the throw head AH and counterbalancing weight WH are in predetermined angular positions, say vertical, comprising a horizontal lock bolt 136 axially reciprocable in a guiding bore or bearing 137 provided on the head-stock housing 99, and having a handle 138 to reciprocate it; and comprising a recess 139 provided on the guideway 69 to receive the end of the lock bolt.

The construction at the tail stock end of the machine comprising a throw head AT and a counterbalance frame FT and a counterweight WT is substantially the same as that described above for the head stock end and like parts are given the same reference characters in the drawing with the suffix T to identify them. The two spindles 68 and 68T have a common axis.

One difference at the tail stock end is that the pulley 102 is replaced by a sleeve 140, which, together with the back plate 104T, is keyed to the spindle 68T by the key 103T.

Another difference is that the spindle bearings 100T and 101T are supported in a quill 141 instead of in the tubular housing portion 98T; and the quill 141 is mounted in longitudinally spaced bearings 142 and 143 in the tubular housing portion 98T; and the quill may be reciprocated axially to position it by a manually rotatable pinion 144 meshed with rack teeth 145 on the quill; whereby the entire assembly of throw head AT and counterbalance device frame FT may be moved axially to position the free ends of the spindles 68 and 68T relatively, to facilitate inserting work pieces into the jaws of the chucks.

It is to be understood of course that the head stock and tail stock are both rigidly mounted on a common base (not shown); and the lock bolts 136T and recess 139T are so positioned that when both lock bolts 136 and 136T are in locking positions, the two parallel screw axes at the tail stock end will be parallel to the two at the head stock end.

The two spindles 68 and 68T have respectively coaxial conical bores 146 and 146T in their confronting free ends, formed to receive machine "centers" for mounting the ends of work pieces that are to be rotated and worked about the common spindle axis.

The entire throw head assemblies, AH and AT are removable as described to clear the ends of the spindles for use with said centers.

The adjustably movable parts of the counterbalancing device at the head stock end, consists of the counterweight WH, the clamped plates 125—126, clamp screws 129—129 and scale pointer 132—133. These parts have a combined weight, arbitrarily predetermined, and due to the simplicity of the parts, this predetermined weight can always be accurately arrived at and known; and may for convenience be referred to herein as Wc.

The corresponding parts of the device of the tail stock end are made to have, accurately, the same predetermined weight, Wc.

The two counterbalancing scales 130—130T are calibrated with respect to this common known accurate predetermined weight Wc, and can therefore be both identical, and pre-calibrated when manufactured.

The predetermined calibration of the scales is in inch-pounds, a typical scale in an illustrative case being shown in Fig. 21, each inch on the scale indicating 300 inch pounds.

The adjustably movable parts of the throw head AH consists of the chuck proper 90, head 93, turtle 85 and parts movable radially therewith, and this weight is known or can readily be found, and it is preferably stamped on the turtle or chuck for convenient reference; and may be referred to herein as WtH.

Similarly, the weight of the adjustably movable parts of the throw head AT, is known or found and stamped thereon and referred to herein as WtT.

In the setting up of the machine for use, the head stock counterweight scale 130 is first set to read zero as follows.

The throwhead AH is adjusted by turning of the screw 78 to bring the axis of the chuck proper, 90, coincident with the axis of the spindle 68, as shown on the throwhead scale 96. This is its zero position as indicated on its scale 96 as described.

It will be understood that the weight WtH, referred to, and also the weight of the guideway 69, and the weight of the counterbalance frame FH, may each be out of balance around the spindle axis.

The counterweight screw 113 is now turned to propel the weight WH until it perfectly counterbalances all of these parts.

The counterweight scale pointer 132 is then adjusted as referred to, to read zero on the scale, and fixed at that adjustment.

The counterweight WT is similarly adjusted and its scale pointer set to read zero on its scale.

The parts referred to, to be balanced as just described, being made from detail drawings, will have weights near enough to known weights, so that the scale also can be made from drawings with a zero scale line on it in such position that the scale pointer will have a sufficient range of adjustment in which it can be moved to indicate zero on the scale.

The actual radial distances of the two counterweights from the spindle axis at zero readings on their scales, may be different, because the weights WtH and WtT as referred to may be different; and the weights of the counterbalance frames FH and FT may be different; and the weights of the guideways 69 and 69T may be different; and the amounts of out-of-balance thereof, respectively, may be different; so that the adjustments of the scale points will be different, but both indicating zero.

As referred to, the counterbalancing invention hereof can be used, universally, to counterbalance work pieces of different types; it being contemplated that the tool for working them will preferably be a rotary grinding wheel, and such being well known has not been shown in the drawing; and for each type of work, the counterweights can be preset on their scales to effect substantially perfect counterbalance without trial-and-error.

One type of work is a straight cylindrical shaft. In such case the two throwheads AH and AT are adjusted to their zero positions by their scales 96 and 96T and the work is gripped therein; and the positions for complete counterbalance to which the respective counterweights may be set are their respective zero positions on their scales.

A similar type of work is a crank shaft having cranks in balance around the main journal axis, and when the main journals are to be ground. Here again complete counterbalance is effected by presetting each counterweight to its zero scale position.

A general class of work is the grinding of the crank journals of a crank shaft, and there are several types of such crank shafts, and the procedure to counterbalance each of them will now be described.

In the first described form of the invention shown in Figs. 1 to 9, describing a crank shaft as the work piece, the weight of the crank shaft as a whole was considered in the formula for predetermining the setting of the counterbalance weights; and the throwheads considered as identical in weight and unbalance; and a single reading for both counterweights to preset them on the scales, was found.

In the more universal form here under consideration, Figs. 10 to 21, the weight of each end of the crank shaft is considered separately, and the weights WtH and WtT of the radially movable parts of the throwheads are considered separately, and each counterweight is preset separately to its own scale reading.

The simplest type of crank shaft is that having two cranks 180° apart, or three cranks 120° apart, or four cranks 90° apart; and they may have flanges on both ends, or a flange on one end and a gear corresponding to a flange on the other end; or no flanges on either end; and the flanges are of approximately equal weight.

A crank shaft of this type is illustrated in Fig. 16.

The center of gravity of the crankshaft is in the axis of the main journals 147—147 and midway between its ends as at 148.

The two chucks are moved outwardly radially, to a distance equal to the "throw" of the cranks, by means of the scale 96 Fig. 12, the throw being known, or measured, in inches and the scale 96 being in inches (reduced scale in the drawing). The shaft ends are gripped in the chucks, to rotate the shaft on the axis of a crank journal 149 to be ground, and the whole shaft resolves around the crank journal axis.

The weight to be counterbalanced by the head stock counterweight WH is the weight of the right hand half of the shaft plus the weight of the radially movable parts, WtH of the throwhead AH.

The head stock counterweight WH can be preset to its balancing position by the formula:

$$Sh = \left(\frac{Ws}{2} + Wth\right)T$$

in which:

$Sh$ is the reading in inch pounds on the scale of the head stock counterweight WH calibrated as aforesaid;
$Ws$ is the weight of the entire shaft;
$WtH$, as hereinbefore described is the weight of the radially movable parts of the throwhead AH;
$T$ is the "throw" of the countershaft in inches.

The tail stock counterweight WT can be present to balancing position on its scale by a similar formula;

$$St = \left(\frac{Ws}{2} + WtT\right)T$$

in which $WtT$ is the weight of the radially movable parts of the throwhead AT.

If there be any possibility that the two halves of the countershaft are not of the equal weight, $$\frac{Ws}{2}$$

then their respective weights are first determined by one's resting one extreme end of the shaft on a support, and weighing the other extreme end.

Such a crank shaft is illustrated in Fig. 17 where the right end is considerably heavier than the left end.

The rectangle 150 at the right end represents a massive, heavy flange for mounting a heavy flywheel on the shaft, and the small rectangle 151 on the left end represents a gear flange.

The center of gravity of the shaft is at some point in the axis of the main journals 152, not at the mid point, but, say, at 153.

The weights of the two ends of the shafts, may be represented by $Wf$ and $Wg$ ($f$ and $g$ indicating flywheel and gear respectively), and are found by weighing them separately as above described.

It is always preferable to mount the heavy end of such a shaft on the head stock throwhead; and if this be done the formula for presetting the counterweight WH is, as described above:

$$Sh = (Wf + WtH)T$$

and for presetting the counterweight WT is:

$$St = (Wg + WtT)T$$

If however the heavy end of the shaft is for some reason mounted on the tailstock throwhead, it will be clear that the formula for presetting the head stock weight WH would be $$Sh = (Wg + WtH)T$$

and the formula for presetting the tail stock counterweight WT would be:

$$St = (Wf + WtT)T$$

As illustrative of the universality, as referred to, of the embodiment of Figs. 10 to 21, another type of crank shaft will now be described, to counterbalance which, by trial-and-error adjustment of a counterbalancing weight or weights as heretofore, would be very difficult and would require very expert knowledge, and if it could be done at all, and in any event, would consume hours of production time.

Such a crank shaft is shown in Figs. 18, 19 and 20 and as seen, is a shaft having a single crank 154 for a single piston engine, and has a heavy flange 155 on one end for fly wheel attachment, and a lighter weight gear flange 156 on the other end; and the crank journal 157 is farther from the fly wheel than from the gear end.

Weights are first found as follows:

W$f$, the weight of the flywheel-flange end, and W$g$, the weight of the gear-flange end; these being found by one's supporting one end and weighing the other end as referred to hereinbefore. The sum of these weights W$f$ and W$g$ equals the weight of the whole shaft, or W$s$.

When these weights, W$f$ and W$g$, are being found, the crank 154 and crank journal 157 hang downwardly, as indicated fragmentarily in Fig. 18 in broken line, with the crank journal 157 directly under the main journals 158—158.

W$m$, the weight at the main bearing axis found by weighing it with the crank horizontal and supported by the crank journal 157 resting on a post 157a as shown in Fig. 20.

W$j$, the weight on the crank bearing axis, found by weighing it with the crank horizontal and supported by the main journals 158—158 resting on posts 158a as indicated in Fig. 19.

The sum of the weights W$m$ and W$j$ also equals the weight W$s$ of the whole shaft.

The work operation may be to grind the main journals 158—158; or it may be to grind the crank journal 157; and the counterweights are to be preset to effect complete counterbalancing in either case.

To counterbalance while grinding the crank journal 157, the whole shaft revolves around the axis of the crank journal.

Assuming as stated that the fly wheel flange 155 is heavier than the gear flange 156, the fly wheel flange would be gripped in the head stock throwhead AH. The presetting position for the headstock counterweight WH will be found by the formula:

$$Sh = \left[\left(\frac{Wf}{Ws} \times Wm\right) + WtH\right]T$$

and the setting for the tail stock counterweight WT will be found by the formula:

$$St = \left[\left(\frac{Wg}{Ws} \times Wm\right) + WtT\right]T$$

In some cases in a crank shaft of this type the gear flange may be heavier than the flywheel flange and would be the one mounted in the headstock throwhead AH; in which case the presetting formula would be, for the head stock counterweight WH:

$$Sh = \left[\left(\frac{Wg}{Ws} \times Wm\right) + WtH\right]T$$

and for the tail stock counterweight TW would be:

$$St = \left[\left(\frac{Wf}{Ws} \times Wm\right) + WtT\right]T$$

If the weights of the flanges on the ends happened to be approximately equal, and the crank approximately half way between the ends, the two formulae would be:

$$Sh = \left(\frac{Wm}{2} + WtH\right)T$$

$$St = \left(\frac{Wm}{2} + WtT\right)T$$

To counterbalance for grinding the main journals 158—158, it is to be noted that the crank may be nearer one end than the other. As indicated in Fig. 18 it may be the distance L$_1$ from the flywheel end and L$_2$ from the gear end, the total length of the shaft being L.

It is preferred to always mount such a crankshaft so that the shorter distance, L$_1$ or L$_2$, as the case may be, is at the headstock end of the shaft.

If, therefore, in the shaft to be mounted, L$_1$ is less than L$_2$, the flywheel end would be mounted in the head stock throwhead AH; but if L$_2$ is less than L$_1$, the gear end would be mounted in the headstock throw head AH.

It will be noted that the out of balance weight to be counterbalanced is that found for W$j$, Fig. 19, rotating around the axis of the chucks gripping the work; and that the chucks are in their coaxial positions; and that all rotating weight except W$j$ will be counterbalanced by the counterweights at their zero positions; and that the counterweights are to be moved from zero to preset them to counterbalance the weight W$j$.

The formula for presetting the counterweight at that head stock where L$_1$ is the shorter, whether it be the head stock or tail stock, is:

$$S = \left(\frac{L_2}{L} \times Wj\right)T$$

and at that head stock where L$_2$ is the shorter, whether it be the head stock end or tail stock, is:

$$S = \left(\frac{L_1}{L} \times Wj\right)T$$

S in each case being the setting on the corresponding scale.

There are types of work that are inherently in balance around an axis of rotation, and are preferably supported on centers in the spindles as referred to.

In such cases the throwheads AH and AT are removed and the centers not shown, are inserted in the conical bores 146—146T.

The only parts then out of balance will be the counterweight frames FH and FT.

In the setting up of the machine in the first place and after the accurate position of the pointer wire 132 has been determined as aforesaid, the counterweight WH is moved to a position where it balances the frame FH and the position of the pointer 132 then determines a point on the scale 130 and this is then indicated on the scale by making a special mark thereon, say "X," see Fig. 21.

Similarly, a special mark "X" is made on the scale 130T of the counterweight WT.

When work is mounted on centers, the respective counterweights can always be preset to these respective special readings on the scales.

As to the invention in general, the end result sought, is to be able to preset a counterweight or counterweights without "trial-and-error," to accurately counterbalance both the unbalanced rotating parts of a work piece gripped in the throwhead chucks of the machine, and the rotating parts of the machine itself which will inevitably be out of balance in an economically designed machine. As will be shown, to attain this end result, a hitherto unsolved problem must be solved.

This problem is solved in both the embodiment of the invention of Figs. 1 to 9, and that of Figs. 10 to 21, above described, in the manner summarized below.

The solution is applicable to various types of work pieces, but the following will be confined to work pieces of the crank shaft type as an illustrative example.

Parts of the throwheads at the two ends of the machine are adjustable radially, and are always out of balance, more or less, and when they are adjusted to make their chucks coaxial with the machine spindle axis, the amounts of unbalance are at the minimum.

Other rotary parts at each end of the machine are always out of balance by a constant amount.

The counterweights are first adjusted, to counterbalance and neutralize these minimum and constant amounts of unbalance and thereby a neutralizing position for each counterweight is determined.

Scales are provided for the respective counterweights which have a permanent fixed "zero" point, indicating these neutralizing positions, from which and back to which the counterweights can be moved.

When a crank shaft is mounted in the chucks in position for its main journals to be worked, the throwheads are adjusted to make the chucks coaxial with the machine spindle axis; and the work piece itself is already in balance around its main journal axis; and therefore all that needs to be counterbalanced is the aforesaid minimum and constant amounts of unbalance; so that the counterweights will effect perfect counterbalance when preset to their zero positions.

When the crank journal of the crank shaft is to be worked, the throwheads are adjusted to move the chucks radially away from their coaxial positions, and the throwheads themselves are thereby put into a new unbalanced condition and the work piece rotates around the axis of the crank journal, and is out of balance and the counterweights at their zero positions no longer effect counterbalance and must be moved from their zero positions to positions at which they counterbalance jointly both the new unbalance of the throwheads and the unbalance of the crank shaft.

To move the counterweights to balance the new unbalance of the throwheads alone, would be a simple matter.

The weights of the radially adjustable parts of the throwheads are known; and therefore for each given radial adjustment thereof, in inches, the amount of the new unbalance of the throwheads could always be found; and corresponding positions for the counterweights could be found in inches from the zero positions at which they would counter balance the new unbalance of the throwheads, and these positions could be indicated on a simple scale calibrated in inches.

But the crank shaft is also out of balance, and the amount of its unbalance will be different for different crank shafts because they will have different weights; and even for a given weight of crank shaft, the radial adjustment of the throwhead in inches will be different for different crank shafts, because of different crank shaft "throws" in inches.

To preset the counterweights to counterbalance jointly both the new out of balance of the throwheads and the out of balance of any one of a variety of crank shafts is what presents the aforesaid problem.

The problem is solved according to the present invention by calibrating the said scales beyond the zero point, in pound inches, predicated upon the weights of the counterweights, in pounds; and by means of simple formulae which give the pound inches on the scales to which the counterweight may be preset to effect the said joint counterbalance.

The formulae include as factors the weights of the throwheads and the weight of the crank shaft in pounds, and the radial adjustment distance in inches; and the solution to the problem is simplified by making the two counterweights of equal weight and making the two scales alike and precalibrated when made.

The following is to be particularly noted in view of the terminology of the claims.

When the throwhead is adjusted to move the chuck radially, to position the crank shaft for grinding a crank journal, the extent of radial movement is the "throw" of the crank, and it is measured from the spindle axis; and the measurement is in inches.

Then, to effect counterbalance, the counterweight is also moved radially away from the spindle axis and in the opposite direction; but the extent of movement is not measured in inches but in precalculated inch pounds; and it is not measured from the spindle axis, but is measured starting from a point already spaced radially from the spindle axis, that is, is measured from the aforesaid predetermined neutralizing point.

I claim:

1. In a work rotating machine tool, a spindle rotatably supported intermediate its ends, a work gripping chuck having a work gripping axis, supported on chuck supporting parts on one end of the spindle; counterweight frame parts on the other end of the spindle supporting a counterweight; the chuck supporting parts comprising a guideway on which the chuck and some of the chuck supporting parts are movable radially rectilinearly to different radial positions; and some of the chuck supporting parts being fixed on the spindle against radial movement with the chuck; the counterweight frame parts comprising a guideway on which the counterweight is rectilinearly movable parallel with the movement of the chuck to different radial positions; the chuck and chuck supporting parts and the frame parts being out of balance around the spindle axis when the chuck is in a position coaxial with the spindle; a scale on the frame parts indicating positions of the counterweight and having a zero mark indicating a position for the counterweight at which it counterbalances the chuck and chuck supporting parts and the frame parts, when the chuck is in said coaxial position.

2. A machine for rotatably supporting a chosen engine crankshaft having crank journals and main journals and end portions coaxial with the main journals, and having a known crank throw, for working the crank journals, comprising a pair of coaxial spindles rotatably supported at intermediate portions thereof, and having spaced confronting end portions to which respectively are connected chuck bases supporting work gripping chucks; the chuck bases comprising portions extending laterally from the spindles, upon which the chucks are adjustably positionable radially of the spindles by operator operable means; the weights of the chucks being substantially equal and each disposed in balance around a respective central gripping chuck-axis and the weights of the chuck bases because of the laterally extending portions being respectively out of balance around the spindle axes; the chucks being positionable by said operator operable means to dispose their gripping axes coincident with the spindle axes, or optionally to dispose their gripping axes at radial adjustments corresponding to the said crank shaft throw and in axial alignment; and the chucks comprising respective operable mechanisms to grip the crank shaft on said end portions to cause the mass of the crank shaft when gripped therein to be rotatable around the axis of the crank journals; power means to rotatably drive one spindle directly, and to drive the other spindle through the gripped crank shaft; counterweight frames respectively secured to the spindles, provided with counterweight guideways, and respective counterweights of equal weight positionable along the guideways by operator operable means on the frames; the guideways being disposed so that the center of gravity of each counterweight in a plurality of positions thereof defines a line intersecting the spindle axis; the weight of the frames because of the guideways and operator operable means being out of balance around the respective spindle axes; indicating means comprising indicators movable with the respective counterweights, and first references stationary with respect to the frames adjacent to the paths of movement of the indicators; each indicator and its reference when in coincidence indicating a reference position for the corresponding counterweight at which without a crank shaft gripped in the chucks as aforesaid and with chuck axes coincident with the spindle axes, it counterbalances the out-of-balance weights of the corresponding frame and of the chuck base, irrespective of differences of weight of the two chuck bases, and differences of weight of the two frames; the counterweights being positionable in other positions spaced from the reference positions at which they counterbalance the frames, chucks, chuck bases and the chosen crank shaft when gripped in the chucks as aforesaid without resorting to trial-and-error positioning, said other positions being indicated by said indicators and another stationary reference for each indicator, the other stationary references being at equal distances from said first stationary references, the distances being predetermined by the weight of the chucks and the weight and throw of the chosen crank shaft, and the weight of the counterweights.

3. A machine for rotatably supporting a chosen engine crank-shaft having crank journals and main journals and end portions coaxial with the main journals and having a known crank throw, for working the crank journals thereof, comprising a pair of coaxial spindles rotatably supported at intermediate portions thereof, and having spaced confronting end portions to which respectively are connected chuck bases supporting work gripping chucks; the chuck bases comprising portions extending laterally from the spindles, upon which the chucks are adjustably positionable radially of the spindles by operator operable means; the weights of the chucks being disposed in balance around respective central gripping chuck-axes and the weights of the chuck bases because of the laterally extending portions being respectively out of balance around the spindle axes; the chucks being positionable by said operator operable means to dispose their gripping axes coincident with the spindle axes, or optionally to dispose their gripping axes at radial adjustments corresponding to the said crank shaft throw and in axial alignment; and the chucks comprising respective operable mechanisms to grip the crank shaft on said end portions to cause the mass of the crank shaft to be rotatable around the crank journals; power means to rotatably drive one spindle directly, and to drive the other spindle through the gripped crank shaft; counterweight frames respectively secured to the spindles, provided with counterweight guideways; and respective counterweights positionable along the guideways by operator operable means on the frames; the guideways being disposed so that the center of gravity of each counterweight in a plurality of positions thereof defines a line intersecting the spindle axes; the weight of the frames because of the guideways and operator operable means being out of balance around the respective spindle axes; indicating means comprising indicators movable with the respective counterweights and first references stationary with respect to the frames adjacent to the paths of movement of the indicators; each indicator and its reference when in coincidence indicating a reference position for the corresponding counterweight at which when the chucks have been positioned by the operator operable means to dispose the work gripping axes of the chucks in coincidence with the spindle axes it counterbalances the out-of-balance weights of the corresponding frame and chuck base, independently of the weights of the chucks and irrespective of differences of weight of the two chuck bases, and differences of weight of the two frames; the counterweights being positionable in other positions at which they counterbalance the frames, chucks, chuck bases and the chosen crank shaft when gripped in the chucks as aforesaid without resort to trial-and-error positioning, said other positions being indicated by the said indicators and another stationary reference for each indicator, the other stationary references being respectively at distances from said first references predetermined as described from the weight of the chucks and the weight and throw of the chosen crank shaft, and the weight of the counterweights.

4. The method of effecting counterbalance in a machine comprising two rotary power driven coaxial spindles each drivingly connected to a respective chuck-base, the bases having respective chucks of equal weight radially positionable thereon, by operator operable means, and each drivingly connected to a counterweight frame; the frames having respective equal counterweights radially positionable thereon, by operator operable means and when a chosen crank shaft having main journals and end portions coaxial therewith and having crank journals and a known crank throw is gripped at its ends in the chucks with the crank journals axially aligned with the spindles; the method including: positioning the chucks coaxially with the spindles; determining a reference position for each counterweight at which without a crank shaft gripped in the chucks, it will counterbalance the corresponding chuck base and frame, independently of the chuck, and irrespective of differences of weight of the two chuck bases and irrespective of differences of weight of the two counterweight frames; gripping the crank shaft ends as aforesaid; moving the respective counterweights from their said respective reference positions directly without trial-and-error to presetting positions at which they counterbalance the frames, chucks, chuck bases and the chosen crank shaft when gripped in the chucks as aforesaid, said presetting positions being at equal distances from said reference positions and said distances being determined as described in the specification from the weight of the chucks and of the counterweights, and the weight and throw of the crank shaft.

5. The method of effecting counterbalance in a machine comprising two rotary power driven coaxial spindles each drivingly connected to a chuck-base having a respective chuck radially positionable thereon, and each drivingly connected to a counterweight frame having a respective counterweight radially positionable thereon, and when a crank shaft is gripped at its ends in the chucks with the crank journals axially aligned with the spindles; the method including: determining a reference position for each counterweight at which it will counterbalance the corresponding chuck base and frame, independently of the chuck and crank shaft, and irrespective of differences of weight of the two chuck bases and irrespective of differences of weight of the two counterweight frames; gripping the crank shaft ends as aforesaid; moving the respective counterweights from their said respective reference positions directly without trial-and-error to presetting positions at which they counterbalance the frames, chucks, chuck bases, and the chosen crank shaft when gripped in the chucks as aforesaid, said presetting positions being at distances from said reference positions and said distances being determined as described in the specification from the weight of the chucks and of the counterweights, and the weight and throw of the crank shaft.

References Cited in the file of this patent

UNITED STATES PATENTS

| | | |
|---|---|---|
| 1,296,979 | Lindsay | Mar. 11, 1919 |
| 2,404,613 | Belden et al. | July 23, 1946 |
| 2,484,887 | Hoier et al. | Oct. 18, 1949 |